United States Patent [19]

Slusher

[11] 4,096,005

[45] Jun. 20, 1978

[54] PYROTECHNIC CLOUD SEEDING COMPOSITION

[75] Inventor: Thomas W. Slusher, Louisville, Colo.

[73] Assignee: Nuclei Engineering, Inc., Louisville, Colo.

[21] Appl. No.: 805,854

[22] Filed: Jun. 13, 1977

[51] Int. Cl.$^2$ ............................................. C06B 45/08
[52] U.S. Cl. ..................... 149/18; 149/19.1; 149/19.6; 149/20; 149/117
[58] Field of Search .................. 149/19.9, 19.8, 19.91, 149/81, 117, 19.3, 19.6, 18, 20, 19.1

[56] References Cited

U.S. PATENT DOCUMENTS

| Re. 29,142 | 2/1977 | Papee et al. ..................... 149/117 X |
|---|---|---|
| 3,046,168 | 7/1962 | Burkardt et al. ................ 149/117 X |
| 3,375,148 | 3/1968 | Finnegan et al. ................ 149/117 X |
| 3,418,184 | 12/1968 | Vetter ................................... 149/19.9 |
| 3,625,855 | 12/1971 | Douda .................................. 149/19.6 |
| 3,668,026 | 6/1972 | Flanagan ........................ 149/19.91 X |
| 3,677,840 | 7/1972 | Shaw et al. ......................... 149/19.3 |
| 3,761,329 | 9/1973 | Zilcosky .............................. 149/19.91 |
| 3,769,107 | 10/1973 | Johnson et al. ....................... 149/19.6 |

FOREIGN PATENT DOCUMENTS

| 146,127 | 7/1962 | U.S.S.R. ............................... 149/117 |
|---|---|---|

*Primary Examiner*—Edward A. Miller
*Attorney, Agent, or Firm*—Ralph F. Crandell

[57] ABSTRACT

A pyrotechnic cloud seeding composition comprising from about 60 to about 85 weight percent silver iodate, from about 10 to about 40 weight percent of a fuel from the class consisting of aluminium and magnesium, from about 5 to about 15 weight percent binder, and from about 0.1 to about 10 percent halogenated organic compound having a melting point of at least about 50° C. One illustrative compound is hexachlorobenzene.

7 Claims, No Drawings

PYROTECHNIC CLOUD SEEDING COMPOSITION

FIELD OF THE INVENTION

The present invention relates to improved pyrotechnic compositions and more specifically to improved pyrotechnic compositions which, upon combustion, cause the generation of ice nuclei for use in weather modification. More specifically, the invention relates to an improved pyrotechnic composition of the type including silver iodate, light metal fuels such as aluminium and magnesium and a binder.

BACKGROUND OF THE INVENTION

Pyrotechnic cloud seeding compositions are generally old and well known. These compositions have been widely used for artificially modifying the weather by injection, in a finely dispersed form such as a smoke, into clouds for purposes of creating ice freezing nuclei. The ice freezing nuclei have the effect of creating rain, reducing hail and even for preventing rain by overseeding. Extensive descriptions of the cloud seeding process and compositions therefor appear in the prior art including issued patents and published literature.

As the art of seeding clouds for weather modification purposes has developed, one of the principal compositions developed for that purpose is a pyrotechnic composition comprised of silver iodate, which upon the burning of the composition produces silver iodide artificial ice nuclei, an inorganic fuel such as the light metals aluminium and magnesium, and a suitable binder such as epoxy resin. The pyrotechnic compositions have been varied by the inclusion of various fuels, binders, oxidizing agents, alkali iodates, and other materials. The effectiveness of these compositions is generally measured in terms of the nucleation efficiency, that is the number of ice nuclei per gram of composition at the nucleation temperature. This temperature is generally in the range of 0° to −20° C. Although the compositions are generally more effective at the lower temperatures, many showing a marked decrease in effectiveness as the temperature approaches 0° C.

The basic principles involved in cloud seeding involve the formation, in a super-cooled cloud, of artificial ice freezing nuclei. The artificial nuclei promote the precipitation of moisture in the form of rain from the super-cooled cloud. The effectiveness of the artificial ice nuclei generating composition is determined by the number of artificial ice nuclei produced per gram of active ingredients, usually silver iodide.

A wide variety of pyrotechnic compositions have been disclosed in the art, and the following patents are illustrative:

| Pat. No. | Issue Date | Inventor | Title |
|---|---|---|---|
| 3,046,168 | 7-24-62 | L. A. Burkhardt | Chemically Produced Colored Smokes |
| 3,140,107 | 7-7-64 | M. M. Williams | Pyrotechnic Composition |
| 3,375,148 | 3-26-68 | W. G. Finnegan | Pyrotechnics Comprising Silver Iodate, Ammonium Nitrate, Nitrocellulose and Nitrate Esters |
| 3,418,184 | 12-24-68 | R. F. Vetter | Smoke Producing Propellant |
| 3,630,950 (now Re. 29,142) | 12-28-71 | H. M. Papee | Combustible Compositions For Generating Aerosols, Particularly Suitable For Cloud Modification and Weather Control and |
| 3,677,840 | 7-18-72 | G. C. Shaw | Aerosolization Process Pyrotechnics Comprising Oxide of Silver For Weather Modification Use |
| 3,698,968 | 10-17-72 | D. M. Johnson | Pyrotechnic Composition |
| 3,769,107 | 10-30-73 | D. M. Johnson | Pyrotechnic Composition For Generating Lead Based Smoke |
| 3,802,971 | 4-74 | L. A. Burkhardt | Pyrotechnic Formulations For Weather Modification Comprising a Mixture of Iodates |

DESCRIPTION OF THE PREFERRED EMBODIMENT

It has now been discovered that the effectiveness of most pyrotechnic cloud seeding compositions can be substantially improved by the addition thereto of small amounts of an halogenated organic compound, particularly hexachlorobenzene. The reason for the effectiveness of the addition of hexachlorobenzene and related materials is not known. It has been observed that compositions incorporating hexachlorobenzene in accordance with the present invention are substantially more effective and produce a greater quantity of ice freezing nuclei than the same compositions without the hexachlorobenzene.

Hexachlorobenzene is a stable solid at the temperatures normally encountered in the production, storage and use of the pyrotechnic compositions up to the point at which the compositions are ignited. Other materials having similar physical characteristics to hexachlorobenzene are the halogenated organic materials including hexabromobenzene, hexaiodobenzene, pentachlorobenzene, pentabromobenzene, tetrachlorobenzene, tetrabromobenzene, tetraiodobenzene, hexachloroethane, hexabromoethane, hexachlorocyclohexane and hexabromocyclohexane. In general, these materials may be characterized as halogenated organic compounds, have a melting point of above about 50° C., are stable solids at room temperature and the temperatures normally encountered during the preparation, packaging, storage and use of the compositions, and decompose in the pyrotechnic flame upon ignition of the composition.

The pyrotechnic compositions are generally those comprising silver iodate or related ice freezing nuclei forming materials, light metals such as magnesium and aluminium, and a binder such as an epoxy or other polymer binder. These basic pyrotechnic compositions are well known in the art. See, for example, the above listed patents, the disclosures of which are incorporated by reference herein.

Pyrotechnic cloud seeding compositions embodying the present invention comprise from about 60 to about 85 weight percent silver iodate, from about 10 to about 40 weight percent of a fuel from the class consisting of aluminium and magnesium, from about 5 to about 15 weight percent binder, and from about 0.1 to about 10 percent of an halogenated organic compound having a melting point of at least about 50° C., which is a stable solid at temperatures normally encountered in the preparation and handling of the pyrotechnic composition prior to ignition thereof, and which decompose in the pyrotechnic flame upon ignition of the composition.

Other oxidizing agents, in addition to the silver iodate, may desirably be added. Such oxidizing agents are known in the art and include ammonium iodate, ammonium nitrate, potassium nitrate, potassium perchlorate, potassium iodate, sodium nitrate, strontium nitrate, and the like.

The following examples illustrate the present invention:

EXAMPLES

One hundred gram mixes of seven formulations were prepared. Each mix consisted of 100 mesh magnesium powder, 200 mesh aluminium powder, very fine silver iodate powder, very fine hexachlorobenzene powder, and low viscosity epoxy for the binder. The weight percentage of each component is shown in Table 1.

Table 1

| Component | EXAMPLE | | | | | | |
|---|---|---|---|---|---|---|---|
|  | I | II | III | IV | V | VI | VII |
| Magnesium | 5.12 | 5.12 | 5.12 | 5.12 | 5.12 | 5.12 | 5.12 |
| Aluminium | 10.63 | 10.63 | 10.63 | 10.63 | 10.63 | 10.63 | 10.63 |
| Silver iodate | 77.05 | 76.86 | 76.67 | 76.30 | 75.55 | 74.05 | 71.05 |
| Hexachlorobenzene | 0.00 | 0.19 | 0.38 | 0.75 | 1.50 | 3.00 | 6.00 |
| Epoxy binder | 7.20 | 7.20 | 7.20 | 7.20 | 7.20 | 7.20 | 7.20 |

Each mix was prepared by weighing the epoxy binder into a clean, pint-size plastic coated cardboard cup. The metal powders were then added and blended using a stainless steel spatula. The silver iodate and hexachlorobenzene were then added and the mixture was mixed very thoroughly until hemogeneous. Mixing was done behind a safety glass shield. Each one hundred gram mix was divided into four 25-gram portions. Each portion was pressed into a phenolic tube, 21/32-inch inside diameter, in three increments, at a pressure of about 3000 psi, forming a pyrotechnic candle. The candles were cured 24 hours at 140° F. A coil of nichrome wire and some igniter slurry was then placed on each pyrotechnic to provide for remote ignition.

Effectiveness tests were conducted on each sample using the following procedure: The pyrotechnic sample was burned in a large wind tunnel to dilute the smoke concentration. A sample was drawn from the wind tunnel in a syringe and injected into a cloud chamber in which a cloud has been formed and stabilized at a known and closely controlled temperature. The quantity of silver iodide in the sample was calculated from the sample burn time, tunnel flow rate, syringe volume, and other known factors. The number of ice crystals which formed in the cloud chamber were measured optically and then related to the quantity of silver iodide to determine "effectiveness", defined as "number of ice crystals formed per gram of silver iodide", as shown in Table 2.

Table 2

| Temp. | EXAMPLE | | | | | | |
|---|---|---|---|---|---|---|---|
|  | I | II | III | IV | V | VI | VII |
| −8.0° C | — | $1.0 \times 10^{11}$ | $6.0 \times 10^{10}$ | $4.5 \times 10^{10}$ | $1.2 \times 10^{11}$ | — | $1.4 \times 10^{12}$ |
| −7.5° C | $6.033 \times 10^{9}$ | — | — | — | — | $6.4 \times 10^{11}$ | — |
| −6.0° C | $6.9 \times 10^{8}$ | — | — | — | — | $4.1 \times 10^{10}$ | — |

From the results shown in Table 2, a difference of about 2 orders of magnitude was found between the 0 and 3% hexachlorobenzene formulations. In other words, the formulation with 3% hexachlorobenzene was 100 times more effective at that percentage than the formulations with none. This is a very significant discovery considering the price of silver. The formulations between 0 and 3% showed intermediate effectiveness, while the one at 6% showed little difference from the 3% formulation. It appears that 3% is near the optimum construction. However, it should be noted that a significant increase in effectiveness did not occur with less than 0.2% by weight addition of the hexachlorobenzene.

It has been observed that the addition of hexachlorobenzene according to the above examples results in the production of a greater quantity of ice freezing nuclei at higher temperatures, that is temperatures in the range 0° to −8° C., as compared to similar compositions without the halogenated organic. While the chlorine bearing material used was hexachlorobenzene, any chlorine compound which is stable at room temperature, and will decompose in the pyrotechnic flame would be expected to work. Glaciation effectiveness tests conducted at −8° C. showed an effectiveness of about $10^{10}$ ice crystals per gram of silver iodide with no hexachlorobenzene added, and about $10^{12}$ with 3, 6, and 9 percent by weight hexachlorobenzene added.

While a certain illustrative embodiment has been described in considerable detail, it should be understood that there is no intention to limit the invention to the specific form disclosed. On the contrary, the intention is to cover all modifications, alternative constructions, equivalents and uses falling within the spirit and scope of the invention as expressed in the appended claims.

I claim as my invention:

1. A pyrotechnic cloud seeding composition comprising a silver iodate containing oxidizing agent, a light metal fuel, a binder and an "effectiveness" improving compound selected from the group consisting of hexachlorobenzene, hexabromobenzene, pentachlorobenzene, pentabromobenzene, tetrachlorobenzene, tetrabromobenzene, hexachlorocyclohexane, hexabromocyclohexane, hexachloroethane, hexabromoethane and mixtures thereof, said compound being solid at temperatures normally encountered in the preparation and handling of the pyrotechnic composition prior to ignition thereof.

2. A pyrotechnic cloud seeding composition as defined in claim 1 wherein said compound comprises from about 0.1 to about 10 percent by weight of the composition.

3. A pyrotechnic cloud seeding composition as defined in claim 1 wherein said compound is hexachlorobenzene.

4. A pyrotechnic cloud seeding composition as defined in claim 3 wherein said hexachlorobenzene comprises from 0.1 to about 10 percent by weight of the composition.

5. A pyrotechnic cloud seeding composition as defined in claim 1 wherein said light metal fuel is selected from the group consisting of aluminium and magnesium and said compound is hexachlorobenzene.

6. A pyrotechnic cloud seeding composition comprising from about 60 to about 85 percent by weight silver iodate, from about 10 to about 40 percent by weight of a fuel selected from the group consisting of aluminum and magnesium, from about 5 to about 15 percent by weight binder and from about 0.1 to about 10 percent by weight hexachlorobenzene.

7. A pyrotechnic cloud seeding composition comprising about 5 percent by weight magnesium, about 11 percent by weight alumium, about 74 percent by weight silver iodate, about 7 percent by weight binder and about 3 percent hexachlorobenzene.

* * * * *